Oct. 17, 1967  W. M. HICKAM  3,347,767
DEVICE FOR MONITORING OXYGEN CONTENT OF GASES
Filed May 10, 1963  2 Sheets-Sheet 1
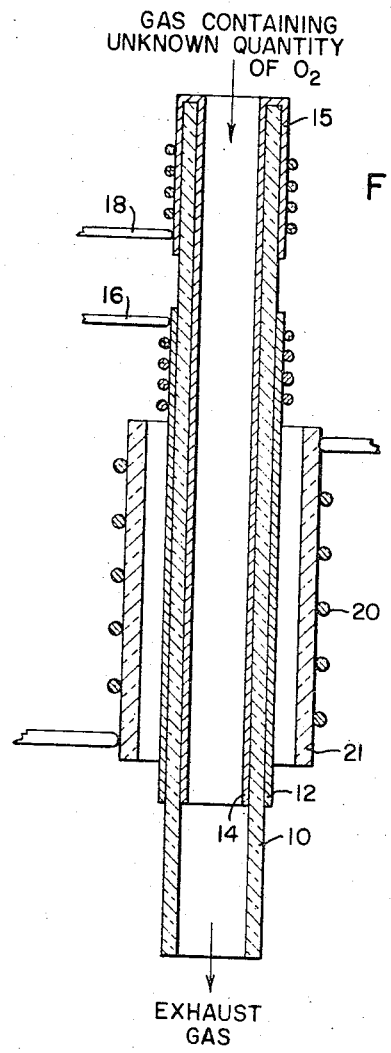
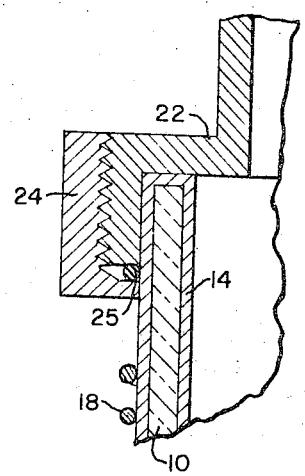
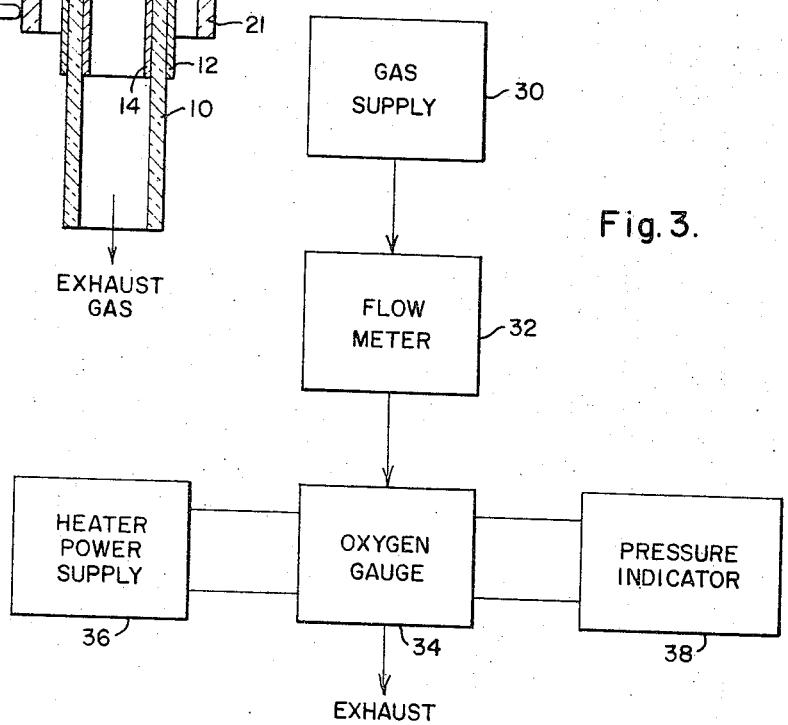
WITNESSES:
John L. Chopp
James F. Young
INVENTOR
William M. Hickam
BY Gordon H. Telfer
ATTORNEY

United States Patent Office 3,347,767
Patented Oct. 17, 1967

---

3,347,767
DEVICE FOR MONITORING OXYGEN CONTENT OF GASES
William M. Hickam, Churchill Borough, Pa., assignor to Westinghouse Electric Corporation, Pittsburgh, Pa., a corporation of Pennsylvania
Filed May 10, 1963, Ser. No. 279,466
6 Claims. (Cl. 204—195)

This invention relates generally to a device for monitoring the oxygen content of gases such as helium, argon and nitrogen and, more particularly, to such apparatus which includes an electrochemical device for producing an electrical signal indicative of the oxygen content of the gas.

In The Review of Scientific Instruments, vol. 32, No. 5, pp. 593 to 595, May 1961, an article entitled, "Oxygen Gauge," by J. Weissbart and R. Ruka disclosed a high temperature galvanic cell for measuring oxygen partial pressures. The application of the device described therein was to measure the partial pressure of oxygen in a vacuum system. The present invention permits the use of a high temperature galvanic cell for monitoring oxygen in a gas.

Large quantities of gases, such as helium, are used in applications requiring high purity. Helium used in the production of liquid helium for cryogenics, in metallurgical processing and for the cooling of atomic reactors, as well as other applications, has a total impurity content of the order of 1–50 atomic parts per million. The impurities are primarily of neon, nitrogen and oxygen with the oxygen being the most detrimental impurity for the intended applications. Consequently, it is desirable to have a means of readily detecting the oxygen content of a quantity of a gas such as helium to ensure that the oxygen level is not beyond tolerable limits.

It is, therefore, an object of the present invention to provide a device which facilitates the monitoring of oxygen content in a gas.

Another object is to provide an improved electrochemical cell structure for monitoring oxygen content in a gas which may be readily fabricated and which minimizes the harmful effects of the heat necessary to operate the device.

Another object is to provide improved apparatus for the monitoring of oxygen content in a gas which facilitates the passage of the gas under test through the device.

The invention, in brief, provides an electrochemical device, capable of producing an electrical signal indicative of the oxygen pressure in a gas, including an electrolyte member of a solid material which readily conducts oxygen ions but has negligible electronic conductivity in the form of a tube with electronically conductive electrodes on the inner and outer walls of which the inner electrode also extends around the end of the tube and contacts a portion of the outer wall to facilitate attachment of lead members thereto. The device is operated with a heater to elevate the electrolyte to a high temperature for appreciable oxygen ion conductivity, the heater being disposed at a position spaced from that at which the leads are attached. When a gas containing an unknown quantity of oxygen is passed through the interior of the tube at a relatively uniform flow rate and a known gas, such as air, is supplied to the outside surface of the tube an EMF is produced across the electrodes which is directly proportional to the log of the oxygen partial pressure in the unknown gas mixture.

The present invention together with the above-mentioned and additional objects and advantages thereof will become more apparent with reference to the following description, taken in connection with the accompanying drawings, in which:

FIG. 1 is a cross sectional view of a device in accordance with the present invention;

FIG. 2 is a partial cross sectional view of a portion of the assembly for the device of FIG. 1;

FIG. 3 is a schematic diagram of a system wherein the device of FIG. 1 may be employed;

Figure 4:
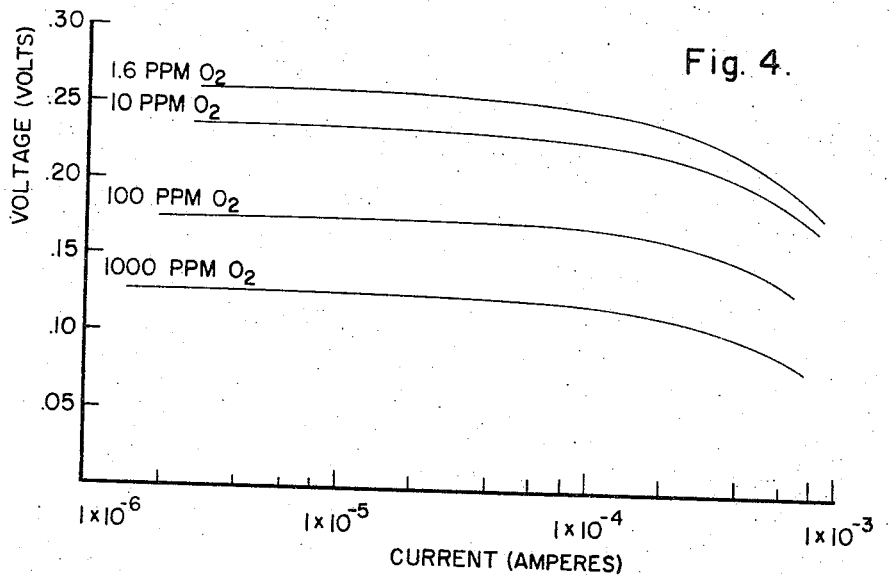
FIG. 4 is a set of curves of voltage against current illustrating the operation of a device in accordance with this invention.

Referring to FIGURE 1, the device comprises a tubular electrolyte member 10 of a solid material which conducts oxygen ions with negligible electronic conductivity. Known suitable materials for the electrolyte member are solid solutions of oxides whose composition can be represented by the formula:

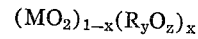

$$(MO_2)_{1-x}(R_yO_z)_x$$

where M represents at least one tetravalent element from the group consisting of zirconium, thorium and hafnium, R represents at least one element from the group consisting of elements which form cations with stable plus two and plus three valences in the oxide such as calcium, barium, strontium and lanthanum, $x$ represents a number having a value of from about 0.1 to about 0.3 and $y$ and $z$ represent numbers having values sufficient to make $R_yO_z$ electrically neutral. A readily available material of this group is a solid solution of zirconium oxide and calcium oxide.

The tubular electrolyte member 10 is open ended to permit the entrance of a gas containing an unknown quantity of oxygen at one end thereof and the exhaust of gas from the other end. The electrolyte member 10 is thin, having a wall thickness of less than about 1/8 inch, and it is continuous so that it is effectively vacuum tight throughout. The inner diameter of the tubular electrolyte member 10 is preferably small so that gas may be supplied at a moderate flow rate, so that the heating requirements are minimized and so that the speed of response of the device is rapid. The inner diameter of the tube is preferably less than about 3/16 inch. The tube is elongated so as to provide an appreciable working area and to facilitate lead attachment, as will be subsequently described, with lengths of at least about forty times greater than the inner diameter being preferred.

Disposed on the outer surface of the tubular electrolyte member 10 in conductive contact therewith is a first electronically conductive electrode 12. A second electronically conductive electrode 14 is disposed on the inner surface of the tubular electrolyte member and a substantial portion of it directly opposes the outer electrode but the inner electrode 14 also extends around the end of the electrolyte so that a portion 15 is disposed on a portion of the outer surface of the tube. The electrodes 12 and 14 are of layers disposed in intimate contact with the electrolyte surface and have electrical continuity but are sufficiently porous to permit gas reactants to reach the electrolyte. It is necessary that the electrode materials be suitable for operation at the high temperatures to which the device is subjected and members of the platinum group of metals are suitable for this purpose.

Lead members 16 and 18 are disposed in conductive contact with each of the electrodes 12 and 14. The lead member 18 to the inner electrode 14 is disposed on the portion 15 of it which is on the outer surface of the electrolyte. The lead members 16 and 18 conveniently are of elongated members which are wrapped tightly around the electrodes and make good electrical contact therewith.

An electrical heater 20 is disposed around the portion of the electrolyte 10 having the first and second electrodes 12 and 14 in opposing relationship so as to bring that portion of the electrolyte to the desired operating temperature of from about 650° C. to about 1000° C. The relatively high operating temperature appreciably increases the ionic conductivity of the electrolyte. The heater 20 is a resistance heater disposed on a suitable mounting 21 of a material such as aluminum oxide ceramic although other heater means may be employed. As a further alternative the gas may be heated externally and supplied hot to the device at a temperature sufficient to heat the electrolyte to the operating temperature.

In operation, the gas whose oxygen content is to be measured is supplied to the upper end of the tube through a vacuum tight seal of which that shown in FIG. 2 is one suitable example. The seal configuration shown in FIG. 2 comprises inner and outer threaded members 22 and 24, respectively, which fit over the end of the tube 10 with the vacuum seal formed by an O-ring 25 compressed therebetween. The gas is supplied at a uniform pressure and a fixed flow rate so that variations in oxygen content may be detected. The flow rate is sufficient to permit operation of the device with the lower end of the tube from which gas is exhausted to be in the atmosphere. Flow rates in the range of from one to four standard cubic feet per hour are suitable. The outside surface of the tube and the outer electrode 12 are exposed to a gas with a known quantity of oxygen for which air is naturally the most convenient. As a result of the differential oxygen pressure on opposite surfaces of the electrode, the inner electrode 14 and the outer electrode 12 provide electrons which engage in the following electrochemical reaction with oxygen at the electrolyte surface:

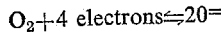

Since the oxygen pressure on the outer electrode 12 is greater than on the inner electrode 14, a net oxygen ion current is produced from the outer to the inner electrods resulting in an EMF across the terminals. This EMF is found to be a logarithmic function of the oxygen concentration in the unknown gas.

FIG. 3 shows a schematic diagram of the system wherein the gas flow is indicated vertically and the electrical flow is indicated horizontally. The gas from the gas supply 30 or system containing gas of which the oxygen content is to be measured is supplied first to a flow meter 32 which may be of any of the well known types for limiting gas flow and from there to the oxygen gauge 34 itself from which it is exhausted to atmosphere. Electrically the device requires a heater power supply 36 for heating the electrolyte to the desired operating temperature where resistance heating is employed. Of course, if convenient, other heating means may be employed. However, it is found that resistance heating is preferable since a restricted area of the device may be heated. The output of the cell is applied to a pressure indicator 38 which is a meter means for giving a visual indication of the electrical signal produced by the oxygen gauge. The pressure indicator may be an ammeter calibrated in a logarithmic scale in parts per million of oxygen.

Figure 5:
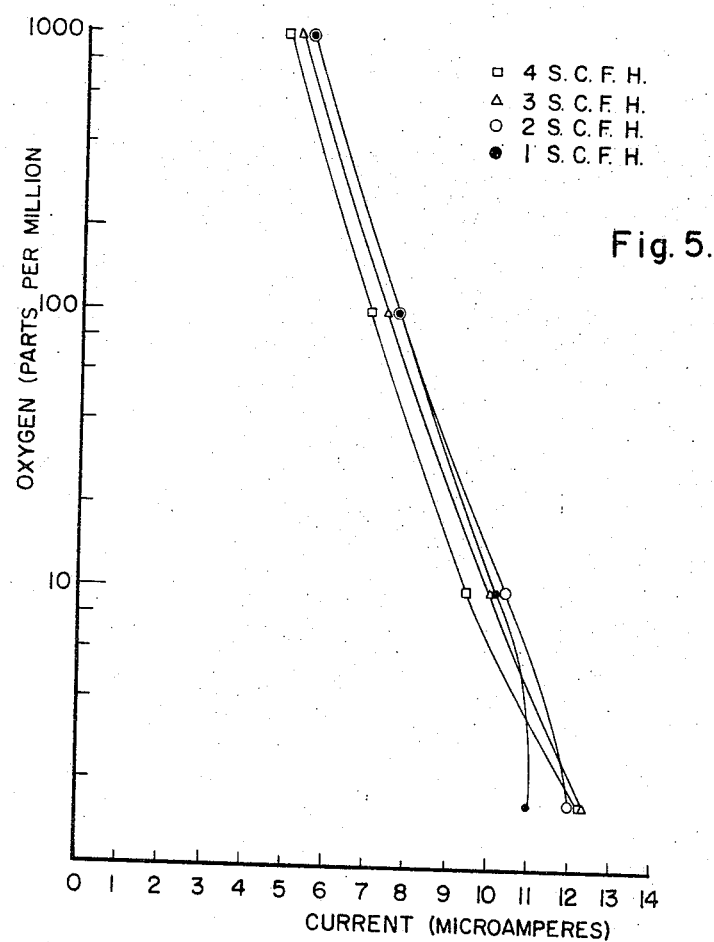
FIG. 5 is a set of curves further illustrating the operation of a device in accordance with this invention.

The following specific example further illustrates practice of this invention. A device was made using as the electrolyte material $(ZrO_2)_{0.8}(CaO)_{0.2}$ with no more than a few tenths of one percent of impurities. The tubular electrolyte member 10 was about eight inches in length with an inner diameter of ⅛ inch and an outer diameter of 3/16 inch. The electrodes were formed by applying a slurry of small particles of platinum in an organic binder and heating to a temperature of from 900 to 950° C. for from about three to four hours to remove the binder and to form an electrically continuous platinum layer. For this purpose, commercially available platinum paste was used after thinning to brushing consistency with xylene. The inner electrode 14 was formed on about six inches of the inner surface and further extended around the end of the tube so that a portion 15 covered about one inch of the outer surface. The outer electrode 12 covered about 4½ inches of the outer surface with a gap of about ½ inch between it and the portion of the inner electrode on the outer surface. Consequently, the inner and outer electrodes were in direct opposition over a length of somewhat in excess of four inches. A Nichrome alloy heating element 20 on an alumina tube 21 having a length of about four inches was disposed around the electrolyte member 10 where the electrodes are in opposition. The remaining portion of the outer electrode 12 and the portion 15 of the inner electrode 14 on the outer surface had leads 16 and 18, respectively, applied thereto by tightly wrapping platinum wire therearound to form a satisfactory contact. The device further was provided with a Chromel-Alumel thermocouple (not shown) affixed within the heated portion of the device to provide an indication that the temperature was remaining constant and that variations in output were not due to variations in the temperature of the cell. The output was read on a zero to 20 microampere meter with a rheostat having a maximum resistance of about 30,000 ohms in series therewith to enable adjustment of the meter to 10 microamperes for helium containing 10 parts per million of oxygen when using a helium flow rate of from one to four standard cubic feet per hour. The inlet to the device was connected to a source of helium which in the tests made comprised samples having ten, 100, 1000 and 1.6 parts per million of oxygen. The results obtained are shown in FIG. 4 where the voltage was measured by a potentiometer with various known resistances from which the current was calculated. The voltage versus current curves of FIG. 4 exhibit nearly constant voltage up to currents of $1 \times 10^{-4}$ amperes. The curves of FIG. 5 were obtained using a zero to 20 microampere ammeter as a volt meter by applying a constant load across the cell. The results are shown in FIG. 5 indicating oxygen partial pressure against the meter reading for various flow rates. The EMF developed across the electrodes of the device may also be measured by other known techniques.

It was found that the device was relatively insensitive to temperature changes, changes of the order of plus or minus 25° C. having little effect on the output. Naturally, if desired some means of automatic temperature control could be provided. It has been found that the parts per million of oxygen can be read from one to 200,000 parts per million with accuracy of plus or minus 3% and response time of $10^{-3}$ seconds with this device.

Devices like that described have also been successfully used to monitor oxygen content of argon and nitrogen and their application extends to other gases which are not combustible at the operating temperature of the device such as carbon dioxide, water vapor, xenon, krypton and neon.

While the present invention has been shown and described in certain forms only, it is apparent that various modifications may be made without departing from the spirit and scope thereof.

What is claimed is:

1. An electrochemical device capable of providing an electrical signal indicative of the oxygen pressure in a gas comprising: a tubular electrolyte member of a solid material conductive of oxygen ions with negligible electronic conductivity; a first electronically conductive electrode disposed in direct contact with the outer surface of said tubular electrolyte member; a second electronically conductive electrode disposed in direct contact with the inner surface of said tubular electrolyte member and extending around one end of said tubular electrolyte member to also be in direct contact with the outer surface thereof; first and second conductive lead members in conductive contact with said first and second electronically conductive electrodes, respectively.

2. An electrochemical device in accordance with claim 1 wherein: said tubular electrolyte member is a cylinder open at both ends to permit passage of gas therethrough; and said first and second electronically conductive electrodes are layers with a substantial portion of their surface areas directly opposing each other on the outer and inner surfaces of said tubular electrolyte member.

3. Apparatus for providing an electrical signal indicative of the oxygen content of a gas comprising: an electrochemical cell including an open-ended tubular electrolyte member of a solid material conductive of oxygen ions with negligible electronic conductivity, inner and outer electronically conductive electrodes disposed as layers on the inner and outer surfaces of said electrolyte member, said inner electrode extending around the end of said electrolyte member in contact with a portion of the outer surface thereof spaced from said outer electrode, first and second conductive lead members in conductive contact with with said inner and outer electrodes, respectively, said lead member in conductive contact with said inner electrode being disposed on the portion thereof on the outer surface of said electrolyte member; and heater means disposed proximate to said electrolyte member where said inner and outer electrodes are in direct opposition across said electrolyte member and spaced from the positions of said lead members.

4. Apparatus in accordance with claim 3 wherein: means for the supply of gas to said inner electrode is disposed at one end of said electrolyte member in a vacuum tight seal to prevent the same gas from reaching said outer electrode, flow meter means is coupled to said means for the supply of gas to maintain a relatively constant gas flow therein, and said heater means is disposed spaced from said vacuum tight seal.

5. Apparatus in accordance with claim 3 wherein: said tubular electrolyte member is a cylinder having a wall thickness of less than about one-eighth inch, an inner diameter of less than about three-sixteenths inch, a length at least about 40 times greater than said inner diameter and consists essentially of $(ZrO_2)_{0.8}(CaO)_{0.2}$; said electrodes consist essentially of platinum; said lead members are elongated and consist essentially of platinum and are wrapped tightly around said electrodes; and said heater means is a resistance heating element encircling said electrolyte member.

6. In a gas handling system, apparatus for measuring the quantity of oxygen in the gas in said system in amounts as low as the order of one part per million, said apparatus comprising: an electrochemical cell including an open-ended tubular electrolyte member of a solid material conductive of oxygen ions with negligible electronic conductivity, inner and outer electronically conductive electrodes disposed as layers on the inner and outer surfaces of said electrolyte member, said inner electrode extending around the end of said electrolyte member in contact with a portion of the outer surface thereof spaced from said outer electrode, first and second conductive lead members in conductive contact with said inner and outer electrodes, respectively, said lead member in conductive contact with said inner electrode being disposed on the portion thereof on the outer surface of said electrolyte member; and heater means disposed proximate to said electrolyte member where said inner and outer electrodes are in direct opposition across said electrolyte member and spaced from the positions of said lead members, meter means electrically coupled to said lead members and providing a visual indication of the quantity of oxygen in said gas by reason of the electromotive force developed across said electrodes when said inner electrode is supplied with a gas containing an unknown quantity of oxygen at a relatively constant flow rate passing through said tubular electrolyte member and said outer electrode is supplied with a gas containing a known quantity of oxygen.

No references cited.

JOHN H. MACK, *Primary Examiner.*

H. T. TUNG, *Assistant Examiner.*